INVENTORS
EDWARD T. MITMAN,
WARREN G. GREENE &
KERMIT B. STAHLER
BY Jack L. Prather
ATTORNEY

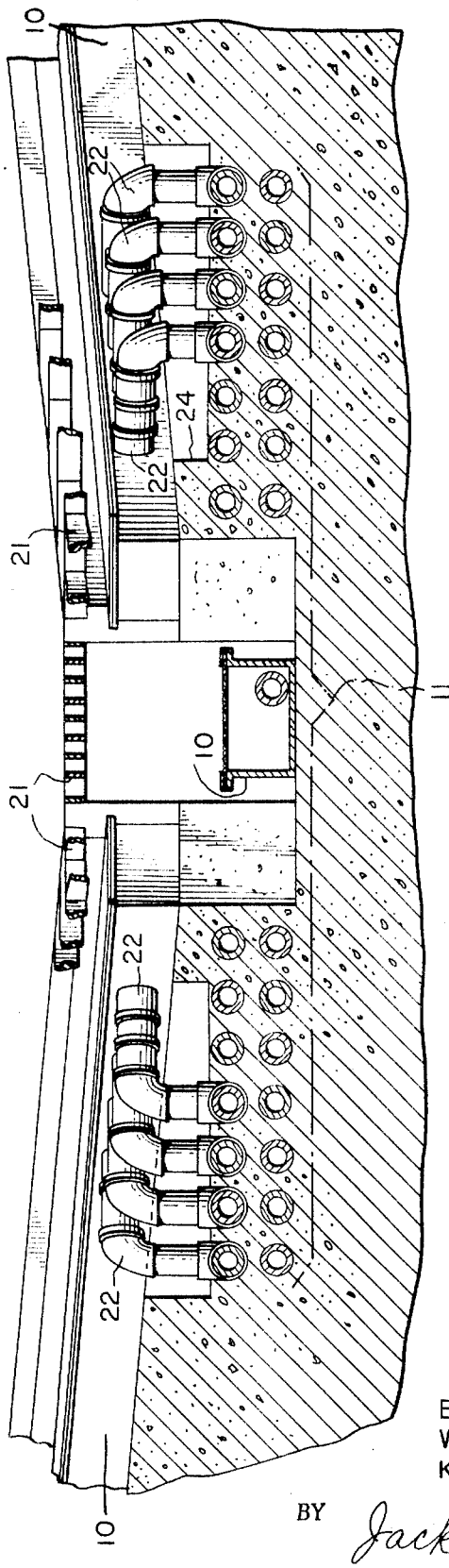

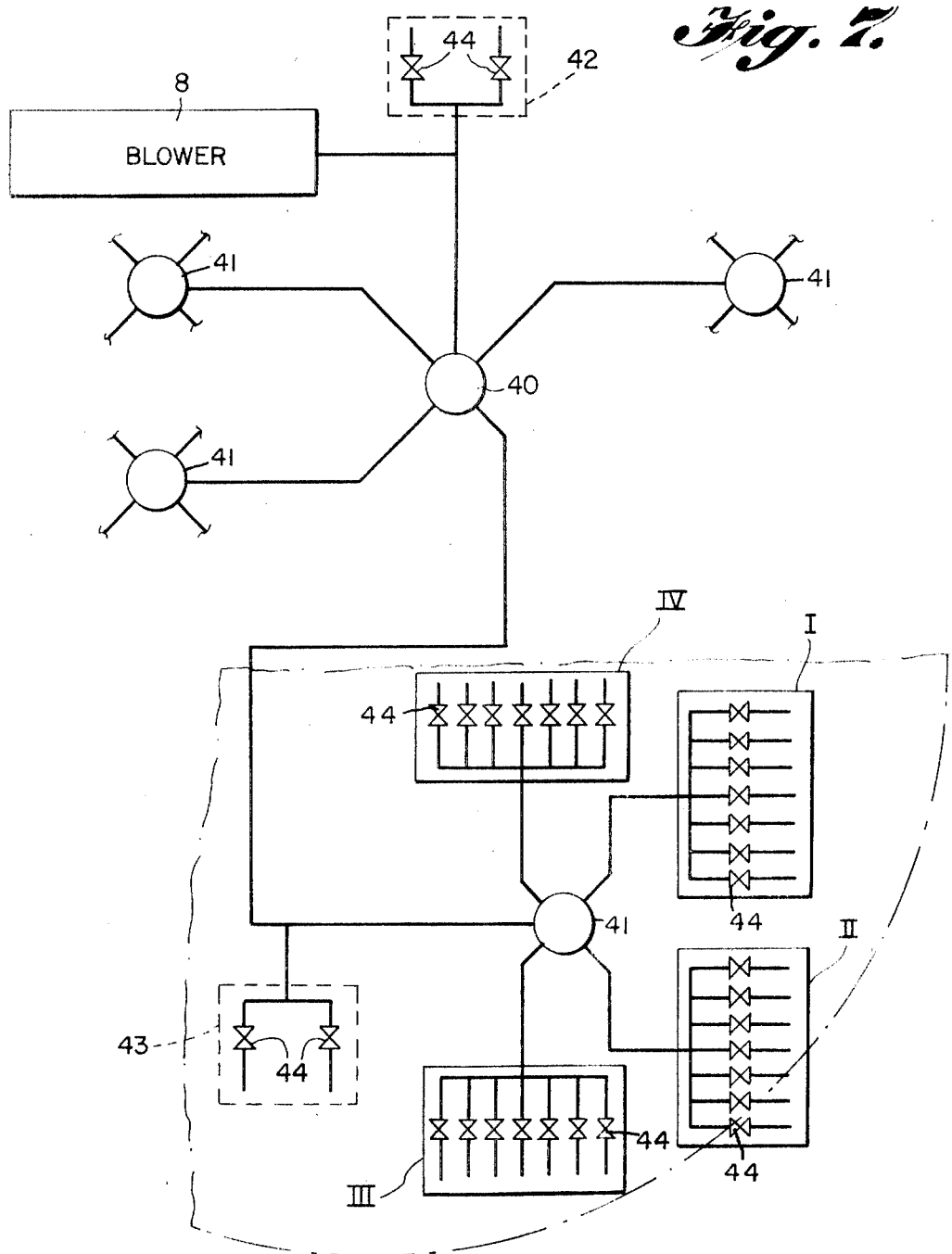

United States Patent Office 3,514,158
Patented May 26, 1970

3,514,158
PNEUMATIC CONVEYING APPARATUS
Kermit B. Stahler, Allentown, Edward T. Mitman, Schnecksville, and Warren G. Greene, Catasauqua, Pa., assignors to Fuller Company, a corporation of Delaware
Filed Apr. 15, 1968, Ser. No. 721,335
Int. Cl. B65g 53/40
U.S. Cl. 302—52                                    8 Claims

ABSTRACT OF THE DISCLOSURE

A fluidizing unit for a pneumatic conveying system having gas supply lines positioned within the fluidizing unit.

Background of the invention

In recent years there has been experienced a large demand for increased diameter silos ranging up to 300 feet in diameter. With such large silos it has become common to arrange the individual gas permeable fluidizing units in series to form successive radially extending patterns. For this type of pneumatic conveying system, the large silo installations have produced substantial problems among which is the tendency of the inner radial portions to produce funneling of the conveying gas through the bulk material being stored. This is due to the increased head of bulk material around the radially extending peripheral portions of the silo.

Funneling is also a naturally occurring phenomenon taking place in a loaded storage silo when the silo discharge outlet is first opened. At such time the material in the area of the discharge outlet falls therethrough by force of gravity. This produces a funneling effect within the area of the discharge outlet and uncovers portions of the silo conveying apparatus within such area. Prior conveying systems known to us have not provided an adequate means of controlling the supply of fluidizing gas or air to such uncovered portion so as to prevent an adequate air supply being distributed to the remaining uncovered portions of the silo conveying apparatus. Also with our invention, and contrary to those prior systems known to us, it is possible to fluidize the silo stored material in progressively radially outward fashion so as to draw material into the discharge area from the inner portions of the silo nearest the discharge. Since the head of material in these areas is less than that of material farthest from the discharge outlet, material can be conveyed with a decreased amount of air or gas as compared to prior known systems.

A second problem is that of the excessive amount of air supply piping and difficulty of installation which was experienced with the prior systems. Prior to our invention it was common practice as shown in U.S. Pat. No. 2,723,838 to imbed the air supply pipes in separate trenches with individual headers extending from the main supply pipe to the respective plenum chamber of each individual gas-permeable fluidizing unit in the system.

Summary of the invention

This invention relates to a pneumatic conveying system for evacuating a storage and/or homogenizing silo wherein fluidizable pulverized bulk materials such as cement or alumina are stored. In particular the invention relates to storage silos equipped with sloped gas-permeable floors, such as floors or portions thereof formed of porous stone, fabric and the like units having gas, for example air, under pressure supplied to the respective plenum chambers of each unit. Such a unit is shown in U.S. Pat. No. 2,609,125.

The present invention overcomes these prior disadvantages and provides a pneumatic conveying system for evacuating a silo which provides means for eliminating funneling.

Further, the invention provides a silo floor equipped with a pneumatic conveying system comprising gas-permeable fluidizing units which can be individually controlled during operation, both manually and/or automatically, with respect to the amount of gas supplied to the plenum chambers of each respective unit.

Still further the present invention eliminates the necessity of separate trenching in the silo floor for the gas supply pipes which provide gas to the plurality of gas fluidizing units arranged in a preselected pattern since the gas supply lines are positioned within the fluidizing units.

Brief description of the drawings

FIG. 1 is a schematic cross sectional view of a storage silo;
FIG. 7 is a schematic view of the gas supply line circuit for the entire silo.

Description of the preferred embodiments

Figure 3:
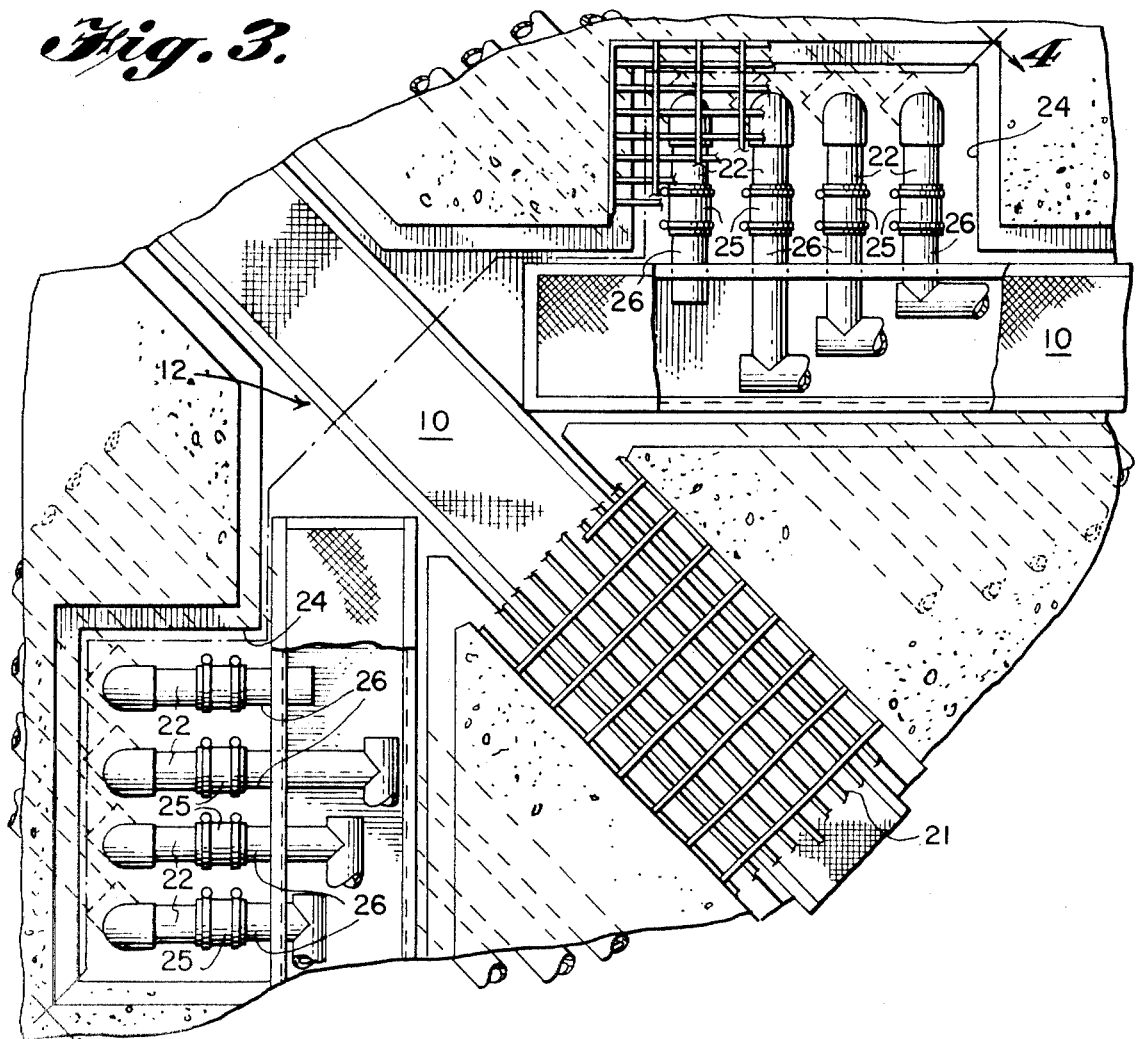
FIG. 3 is a detailed, cross sectional, enlarged fragmentary plan view of portion A of FIG. 2.

As shown in FIG. 1, the storage silo comprises a cylindrical side wall portion 1, a top wall 2 having an opening 3 for the conveyance of bulk materials to the silo, and a floor 4 sloped radially inwardly and downwardly to a center discharge portion 5. The floor portion is preferably formed of poured concrete. Situated below the floor and below ground level is a cellar 6, having a conveyor 7, which conveys evacuated bulk material from the silo to a second conveying apparatus (not shown) of any suitable type for conveying the evacuated material above ground for further use. Also situated in the cellar is a blower 8 and other operating apparatus, such as the control valving shown in FIG. 7. The gas permeable fluidizing units are arranged in pattern in recessed portions of the silo floor 4 in a manner described below.

Figure 2:
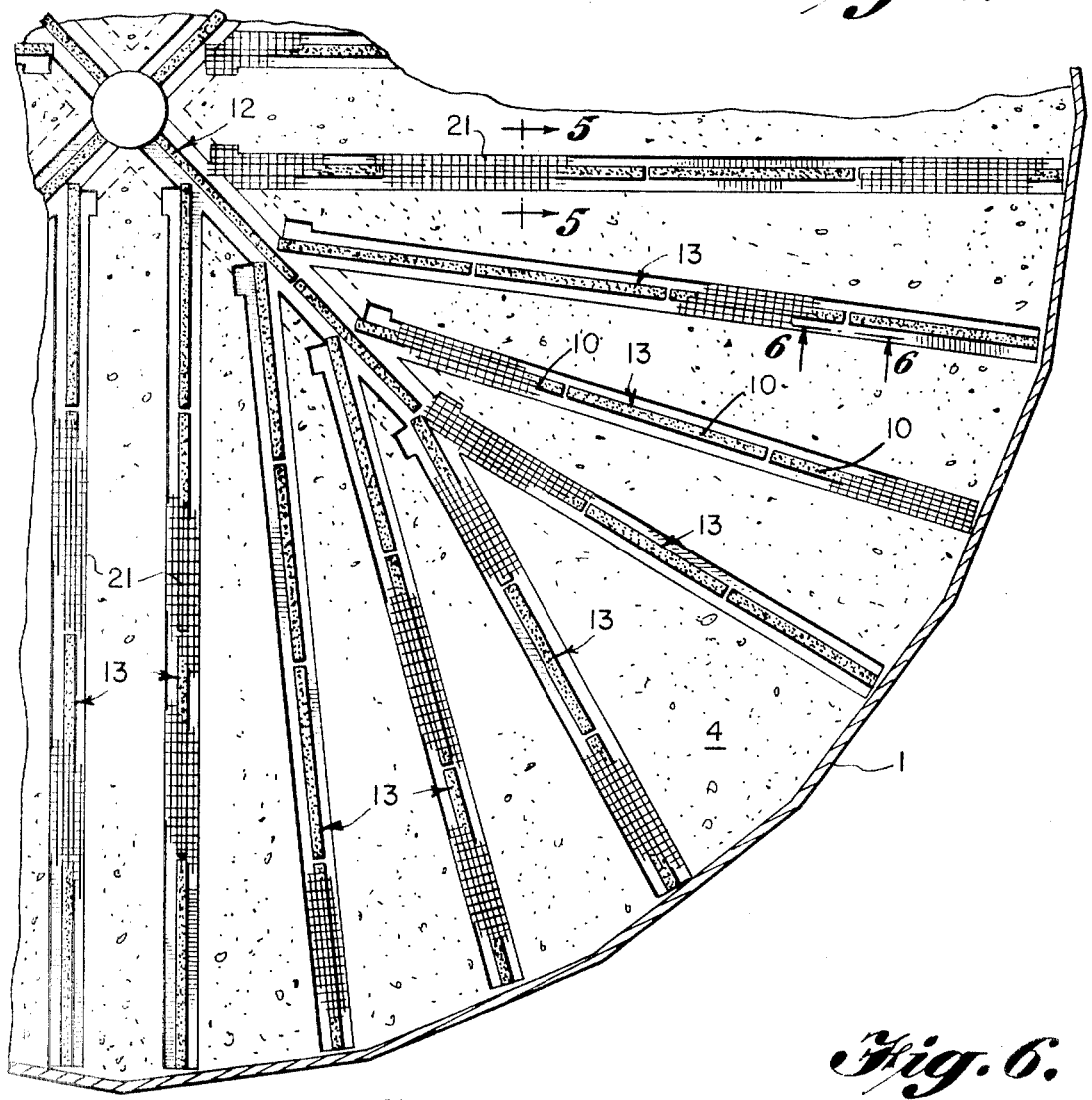
FIG. 2 is a partial plan view showing one quadrant of the storage silo and a preferred general arrangement of gas permeable fluidizing units arranged in a preferred pattern.

In FIG. 2 there is shown a pattern or network of individual gas permeable fluidizing units or sections 10 such as shown in the aforementioned U.S. Pat. No. 2,609,125. The pattern shown is commonly referred to as a "finger" or "crow's foot" pattern, and, in each quadrant, consists of one radially extending collecting line 12 and a plurality of diverging branch lines 13. Each line comprises a plurality of fluidizing sections connected end to end by the gas supply lines described below. The gas supply lines for supplying each fluidizing unit 10 with gas at its plenum chamber are nested together in a common trench as indicated at 11 in dotted lines and as shown more clearly in FIG. 3.

Figure 4:
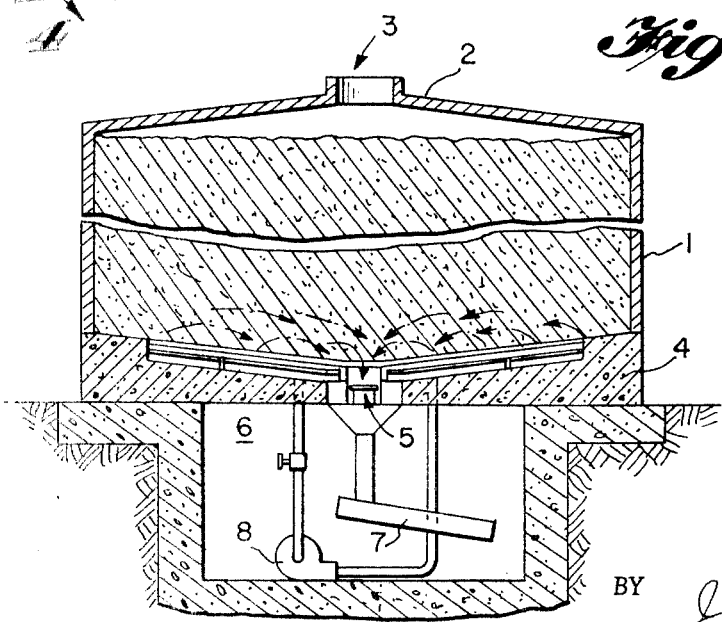
FIG. 4 is a vertical sectional view taken along lines 4—4 of FIG. 3.

FIG. 3 and FIG. 4 show the novel manner in which air or other fluidizing gas is supplied to the respective fluidizing units 10. The units 10 are laid in trenches 20 shown more clearly in FIG. 5. Each unit 10 may be of the same size and for large silos, ranging upwards of 250 feet diameter, may be 6" x 10" x 30'. The trenches 20 and recessed fluidizing units 10 are covered by grating 21. Each fluidizing unit 10, in a respective branch line 13 leading off from the four radially extending fluidizing collecting lines 12, is provided with a separate gas supply pipe 22 open to its plenum chamber. These pipes are nested together as a group in a common trench 11 which may be open and suitably covered by a steel plate or the like at silo floor level, or be filled with concrete.

Figures 5, 6:
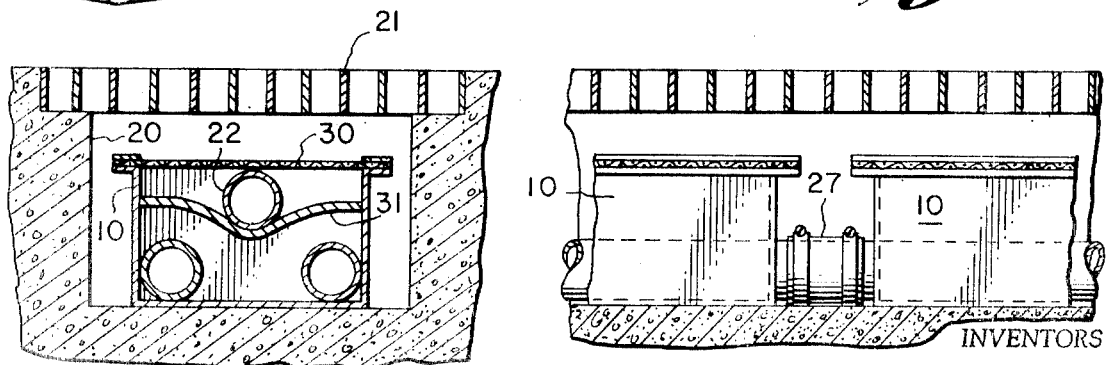
FIG. 5 is a sectional side view taken along lines 5—5 of FIG. 2.
FIG. 6 is a longitudinal sectional view taken along lines 6—6 of FIG. 2.

All gas supply pipes lead from the gas supply blowers 8 located in cellar 6. At the junction of the branch line 13, having four fluidizing sections, with the radial collecting line 12 there is provided four gas supply pipes 22 extending upwardly through a well 24 to the side wall portion of the innermost fluidizing unit of the branch line 13 where each pipe is sealingly connected by means of flexible hose couplings 25 or the like to respective headers 26. The gas supply pipe for the radially innermost unit of each branch line 13 openly discharges into the plenum chamber of the innermost unit of each branch line 13. The remaining fluidizing supply pipes are nested within the plenum chamber of the first unit of the branch lines 13 and extend longitudinally for its full length where they are connected to the next succeeding unit 10 by means of respective flexible hose couplings 27 as shown in FIG. 6. One of these additional lengths of pipe openly discharges into this next succeeding unit and the others extend the full length thereof and so on until each unit is supplied with air or other suitable fluidizing gas from a respective pipe. This novel arrangement provides means for individually controlling the rate, in cubic feet per minute, of gas to each unit by providing a separate gas supply pipe for each unit. Each pipe is equipped with an individual control valve means as is described below. Also, the amount of gas supply pipe trenching is maintained at a minimum.

FIG. 5 shows another important feature of our invention wherein the permeable fabric or other permeable media is additionally supported by the gas supply piping itself. The fabric 30 is supported at its middle by one of the air supply pipes 22 which in turn rests upon a strap or foil member 31 which is fixed to the side wall portion of the unit 10 of the branch lines 13. It will be obvious to one skilled in the art that foil member 31 may be flexible or preshaped. Further, other equivalent means, including those which may be adjustable, for supporting the gas supply pipe 22 may be used. As shown, the pipe 22 supporting the fabric 3 of the units 10 terminates within the innermost fluidizing unit of each branch line. However, it is to be understood that the supporting pipe 22 could extend throughout the branch lines 13 of the fluidizing units 10.

FIG. 7 shows the gas supply piping control circuit. Gas is supplied by means of blower 8 directly to a main control valve 40 and valve control means 42 and 43. Valve control means 42 is provided for the pneumatic conveyor unit 7 at the discharge outlet 5 of silo 1. In the embodiment shown, the pneumatic conveyor unit 7 is similar in construction to fluidizing units 10 but is of the closed type as shown in U.S. Pat. No. 2,527,455. The valve control means 42 comprises two conventional manual butterfly valves 44, of same construction connected to separate respective gas supply lines one of which is of smaller internal diameter than the other so as to provide a means of gas supply to conveyor 7 other than by throttling a single control valve 44. Valve control means 43 comprises two individual manual valves 44, of the same construction as those of valve control means 42. Each of these valves can be throttled to control gas supply to the respective radially extending fluidizing lines, one for each silo quadrant.

Main control valve 40 is preferably automatically controlled by conventional means (not shown) in accordance with a preselected timing cycle as is well known in the art of blending and described in U.S. Pat No. 2,844,361. Such a valve can also be manually controlled. Valve 40 is preferably constructed to direct gas to one four-way quadrant distribution valve 41 at a time. In FIG. 7, four such valves 41 are shown, one for each quadrant. Each is of the same construction and controls the gas supply to the respective radial and branch fluidizing lines in the same manner. Therefore, the complete control diagram for only one quadrant is shown. From distribution valve 41 for the quadrant shown in FIG. 2 there are provided four individual control boxes I–IV. Each of these boxes represents the gas supply lines leading to the individual fluidizing units 10 of each pair of alternately spaced branch lines arranged within the quadrant. Each of the gas supply lines within the box I–IV is provided with a manually controllable valve 44 as earlier described. The purpose of including a valve for each gas supply line is to allow the operator to throttle the supply of gas to each unit in case the arrangement and/or load of the bulk material within the silo causes an undesirable distribution of gas to each unit 10. Provision of the valves 44 associated with quadrant distribution valve 41 also allows the operator to shut off the gas to a particular unit 10 in the event it has failed. The preferred timing cycle for evacuating material from the silo is to provide fluidizing gas via blower 8, main control valve 40 and quadrant distribution valve 41 of one quadrant, first to the pair of branch lines represented by numeral I for a preselected period of time, then to pairs II for the same period of time, and so on, first completing one quadrant and next in successive order to the remaining quadrants. Quadrant distribution valves 41 are automatically controlled according to a preselected timing cycle in the same manner and as part of the same integrated circuit as main control valve 40. The automatically controlled switching valves and timing circuit in general therefore form no part of our invention. Other sequences may also be used. For example, certain preselected branch lines in all quadrants can be actuated simultaneously or individually, such as in side discharge type silos.

While we have shown one preferred embodiment of our invention, we do not wish to limit ourselves to such except as covered by the scope of the claims herein. For example, it will be obvious to those skilled in the art that our invention can be carried out on silos having other fluidizing unit patterns and points of discharge. For example, our invention works equally well with a silo having a side discharge wherein fluidizing line of one or more units 10 slopes downwardly and converges at a point near the side discharge outlet.

Having thus described the invention, with particular reference to the preferred forms thereof, it will be obvious to those skilled in the art to which this invention pertains, after understanding the invention, that various changes and modifications may be made therein without departing from the spirit and scope of the invention, as defined in the claims appended hereto.

We claim:

1. In combination, a silo for storing fluidizable bulk materials and comprising a downwardly sloping floor having a discharge opening, said silo floor comprising a plurality of gas-permeable fluidizing units provided for the purpose of conveying the bulk materials from said silo, said units being arranged in a preselected pattern, said pattern comprising a plurality of said fluidizing units arranged end to end of one another to form a fluidizing line, each of said fluidizing units comprising a bottom portion forming a plenum chamber and an upper portion having a gas permeable media through which gas supplied to said plenum chamber will flow, means for supplying gas to said plenum chamber, said supply means comprising a main gas supply source, and a gas supply conduit for each fluidizing unit, said gas supply conduits for at least one fluidizing line being nested together in a parallel longitudinally extending fashion and situated below the upper surface of said silo floor and being connected to the plenum chamber of the first radially inwardly situated fluidizing unit of each fluidizing line, at least one of said gas supply conduits being open to said first fluidizing unit plenum chamber, the remainder of said gas supply conduits extending longitudinally through the plenum chamber of said first fluidizing unit, each one of said remaining gas supply conduits terminating in a respective one of said remaining fluidizing units to supply gas to such respective unit.

2. In combination, a silo for storing fluidizable bulk materials and comprising a downwardly sloping floor having a discharge opening, said silo floor comprising a plurality of gas-permeable fluidizing units provided for the purpose of conveying the bulk materials from said silo, said units being arranged in a preselected pattern, said pattern comprising a plurality of said fluidizing units arranged end to end of one another to form a fluidizing line, each of said fluidizing units comprising a bottom portion forming a plenum chamber and an upper portion having a gas permeable media through which gas supplied to said plenum chamber will flow, means for supplying gas to said plenum chamber, said supply means comprising a main gas supply source, and a gas supply conduit for each fluidizing unit, said gas supply conduits for at least one fluidizing line being nested together in a parallel longitudinally extending fashion and situated below the upper surface of said silo floor and being connected to the plenum chamber of the first radially inwardly situated fluidizing unit of each fluidizing line, at least one of said gas supply conduits being open to said first fluidizing unit plenum chamber, the remainder of said gas supply conduits extending longitudinally through the plenum chamber of said first fluidizing unit, each one of said remaining gas supply conduits terminating in a respective one of said remaining fluidizing units to supply gas to such respective unit, each of said gas supply conduits comprising a plurality of sections, and means for sealingly connecting said sections of at least one gas supply conduit, said connecting means comprising a flexible coupling arranged at the respective abutting end portions of said sections, and said connecting means being arranged between the end portions of successive pairs of said fluidizing units.

3. In combination, a silo for storing fluidizable bulk materials and comprising a downwardly and radially inwardly sloping floor having a discharge opening at the center thereof, said silo floor comprising a plurality of gas-permeable fluidizing units recessed therein so as to be arranged below the upper surface thereof and provided for the purpose of conveying the bulk materials from said silo, said units being arranged in a preselected pattern so as to provide a substantially equal distribution of same along said silo floor, said silo being substantially cylindrical and said preselected pattern in each quadrant of said silo comprising one radially extending fluidizing connecting line originating at said center discharge opening and a plurality of successive pairs of V-shaped fluidizing branch lines arranged in substantially parallel relation to one another extending outwardly from and at successive points of junction along said radially extending fluidizing line, each said branch line terminating at a point near the periphery of said cylindrical silo, at least one of said fluidizing lines comprising a plurality of gas-permeable fluidizing units, each of said fluidizing units comprising a bottom portion forming a plenum chamber and an upper portion having a gas-permeable media through which gas supplied to said plenum chamber will flow, means for supplying gas to said plenum chamber, said supply means comprising a main gas supply source, and a gas supply conduit for each fluidizing unit, said gas supply conduits for at least one fluidizing line being nested together in a parallel longitudinally extending fashion and situated below the upper surface of said silo floor and being connected to the plenum chamber of the first radially inwardly situated fluidizing unit of each fluidizing line, at least one of said gas supply conduits being open to said first fluidizing unit plenum chamber, the remainder of said gas supply conduits extending longitudinally through the plenum chambers of the remaining successively arranged fluidizing units of said fluidizing line and at least one of said remaining gas supply conduits being open to a respective one of said remaining fluidizing units, each of said gas supply conduits comprising a plurality of sections, and means for sealingly connecting said sections of at least one gas supply conduit, said connecting means comprising a flexible coupling arranged at the respective abutting end portions of said sections, and said connecting means being arranged between the end portions of successive pairs of said fluidizing units.

4. The combination of claim 3 wherein at least one of said gas supply conduits that extends through said plenum chambers supports the gas-permeable media of the respective fluidizing units.

5. The combination as defined in claim 1 wherein means are provided for selectively controlling the rate of gas supplied to each said plenum chamber by said gas supply means.

6. The combination as defined in claim 3 wherein means are provided for selectively controlling the rate of gas supplied to each said plenum chamber by said gas supply means.

7. In combination, a vessel for storing fluidizable bulk materials and having a floor means, said floor means comprising a plurality of gas-permeable fluidizing units provided for the purpose of fluidizing the bulk materials within said vessel, said units being arranged in a preselected pattern, each of said fluidizing units comprising a bottom portion forming a plenum chamber and an upper portion having a gas permeable media through which gas supplied to said plenum chamber will flow, supply means for delivering gas to said plenum chamber, said supply means comprising a main gas supply source, and a gas supply conduit for each fluidizing unit, a plurality of gas supply conduits being nested together in a parallel longitudinally extending fashion and situated within the plenum chamber of one of said fluidizing units, one of said gas supply conduits being open to said one fluidizing unit plenum chamber, the remainder of said gas supply conduits extending longitudinally through said one plenum chamber, and each one of said remaining gas supply conduits terminating in a respective one of said remaining fluidizing units to supply gas to such respective unit.

8. The combination as defined in claim 7 which further comprises control means for selectively controlling the rate of gas supply to each fluidizing unit, said control means including individual valve means for each gas supply conduit and adapted to be located at a common point away from the material being stored.

References Cited

UNITED STATES PATENTS

| | | | |
|---|---|---|---|
| 1,971,853 | 8/1934 | Ihlefeldt | 302—29 |
| 2,565,835 | 8/1951 | Adams | 302—53 |
| 2,815,987 | 12/1957 | Sylvest | 302—52 |
| 2,919,955 | 1/1960 | Paton | 302—29 |

ANDRES H. NIELSEN, Primary Examiner